United States Patent [19]

Allison

[11] Patent Number: 4,755,244

[45] Date of Patent: Jul. 5, 1988

[54] METHOD OF FORMING A SEAL

[75] Inventor: Robert S. Allison, San Gabriel, Calif.

[73] Assignee: General Connectors Corporation, Burbank, Calif.

[21] Appl. No.: 914,363

[22] Filed: Oct. 2, 1986

Related U.S. Application Data

[63] Continuation-in-part of Ser. No. 710,850, Mar. 12, 1985, abandoned.

[51] Int. Cl.⁴ .............................................. F16J 15/32
[52] U.S. Cl. .................................... 156/158; 156/218; 277/164; 277/228
[58] Field of Search ............... 156/158, 159, 503, 203, 156/218, 245; 277/1, 164, 223, 227, 229

[56] References Cited

U.S. PATENT DOCUMENTS

| 2,703,300 | 3/1955 | Koon | 156/158 X |
| 3,698,727 | 10/1972 | Greenwald | 277/228 X |
| 3,723,216 | 3/1973 | Kirkwood | 156/158 X |
| 3,782,994 | 1/1974 | Doherty | 156/203 X |
| 4,111,440 | 9/1978 | Young | 277/1 X |
| 4,453,723 | 6/1984 | Greenwald | 277/164 |

Primary Examiner—David Simmons
Attorney, Agent, or Firm—Julius Rubinstein

[57] ABSTRACT

This invention relates to a method of forming a fire resistant seal from a tubular ring of elastomeric material having a garter spring movably mounted in the bore of the seal.

5 Claims, 3 Drawing Sheets

METHOD OF FORMING A SEAL

This is a continuation in part of patent application Ser. No. 710,850, filed Mar. 12, 1985 now abandoned.

BACKGROUND AND STATEMENT OF THE PROBLEM

As described more fully in U.S. Pat. No. 4,453,723, there is a need in aircraft for a fire resistant seal which has a garter spring movably mounted in a centrally disposed bore in the seal where the bore and the garter spring are in spaced relationship to the inner work contacting surface of the seal and where the diameter of the turns of the garter spring is slightly less than the diameter of the cross section of the bore. With this arrangement, when the garter spring is in the bore the garter spring can contract independantly of the ring shaped seal over a wide temperature range for a prolonged period of time. Additionally, with the diameter of the turns of the garter spring only slightly smaller than the diameter of the cross section of the bore in the seal the compressive force exerted by the garter spring will be spread over a larger surface of the work engaging part of the seal resulting in an extended work life.

The seals described above and more fully in U.S. Pat. No. 4,453,723, are used to connect aircraft ducts together. Since these ducts often conduct air to the passenger compartment, these seals must have sufficient mass to withstand high temperatures for a reasonable length of time, to prevent smoke which may be caused by a fire, from entering the ducts and getting into the passenger compartment. Moreover, the garter spring inside seal ring must be fully enclosed to prevent high temperatures such as may be caused by a fire, from destroying the garter spring and rendering the seal ineffective. This is because a garter spring loses elasticity at high temperatures, such as may be caused by a fire.

However, the previous method of forming a seal, as described in U.S. Pat. No. 4,453,723 was unsatisfactory because the tolerances and physical characteristics of the finished seals were not sufficiently uniform.

This prior method required a tubular semi-cured rubber or elastomeric insert to be formed by a conventional extruding machine. This insert was cut to the required length. Next a garter spring, also cut to the desired length was inserted in the bore of the tube. The ends of the garter spring were designed so they could be secured together in a manner well known in the art to form a tubular ring with the garter spring movably mounted in the bore of the tubular ring.

Next layers of silicon impregnated fiberglass cloth were inserted in a mold cavity. Then the ring shaped tubular insert was laid over the fiberglass cloth in mold cavity, and the mold was closed. Finally the mold was inserted in an oven long enough to cure the elastomeric material and form the seal.

This method was not satisfactory because in the curing process, contrary to expectation, the semi-cured elastomeric insert would contract down around the garter spring in a random fashion so that the garter spring was not always free to move in the seal. Consequently, seals manufactured by this method did not have uniform performance characteristics and were not reliable.

To overcome this problem it is proposed to eliminate the problems caused by using a tube of a elastomeric material in a semi-cured state and instead use a tube of a elastomeric material in a set-cured condition. The ends of the tube would be cemented together to form a ring and a slit would be formed in the tube which communicates with the bore in the tube. Then the facing surfaces of the slit would be pried apart and a suitably shaped garter spring would be inserted in the tube. After this the facing sides of the slit would be cemented together to isolate the garter spring in the bore in the tubular ring.

However the critical importance of forming the slit so the facing surfaces of the slit complement each other was not initially realized. Because of this, attempts were made to extrude the tube of elastomeric material in a set-cured condition with a slit formed in the tube by the extruding machine. However this approach was not satifactory because when the facing surfaces of the slit were cemented together with the garter spring in the bore, the shape of the seal was distorted so the seal did not have uniform performance characteristics. Thus the seals were not reliable and were no better than the seals produced in accordance with the teachings in U.S. Pat. No. 4,453,723.

What is needed therefore, and comprises an important object of this invention, is to provide a method of forming a seal with a garter spring movably mounted within a bore in the seal by cutting a slit in the periphery of the seal for insertion of the garter spring into the bore of the seal, in such a way that the facing surfaces of the slit are complementary to each other. With this arrangement when the facing surfaces of the slit are cemented together with the garter spring in the bore of the seal, the shape of the seal will not be distorted, and seals made this way will have uniform performance characteristics.

This and other objects of this invention will become more apparent when better understood in the light of the accompanying specification and drawings wherein:

FIG. 1 is a perspective view of the tubular elastomeric material from which the seal is formed, cut to the proper length after it leaves the extruding machine, and showing the bore formed in the tube.

FIG. 2 discloses the elastomeric tube after its ends have been cemented together to form a ring.

FIG. 3 discloses the ring shaped seal mounted on a rotating spindle and showing a sharp knife blade advancing to cut a circumferential slit in the seal which will communicate with the bore in the seal.

FIG. 4 discloses an enlarged cross sectional view of the seal showing the knife cut slit in the ring communicating with the bore in the ring.

FIG. 5 discloses the seal shown in FIG. 4 after the split sides of the seal were seperated and the garter spring was inserted in the bore in the ring.

Figure 7:
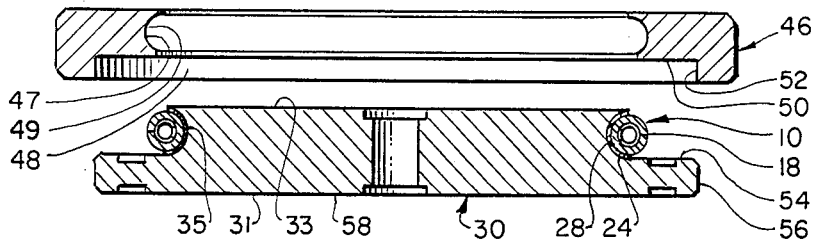
FIG. 7 is an exploded cross sectional view of the mold with the seal mounted on one or more layers of fiberglass cloth positioned in the mold cavity.
Figure 8:
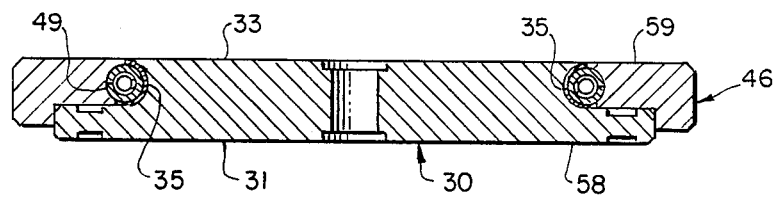

FIG. 8 discloses the mold shown in FIG. 7 with its two parts in assembled relation and the seal in the mold cavity.

Figure 9:
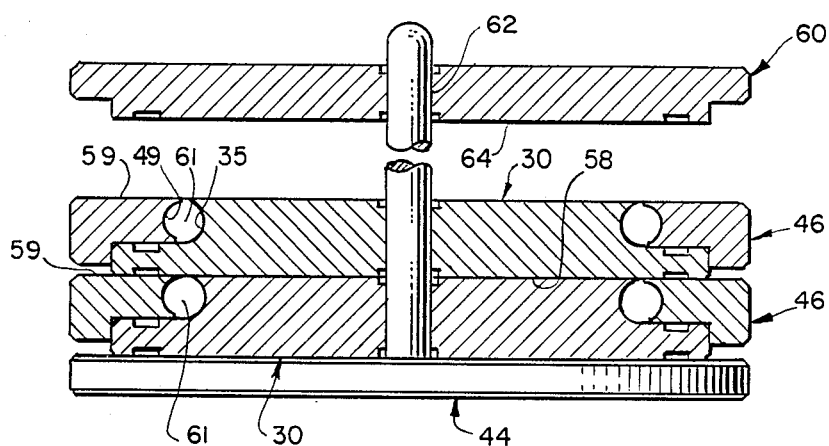

FIG. 9 is a cross sectional view disclosing a stack of molds mounted one on top of another so that a number of seals can be formed simultaneously.

Figure 10:
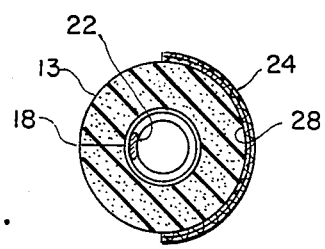

FIG. 10 is an enlarged cross sectional views of a completed seal formed by the mold shown in FIGS. 7, 8, and 9.

Figure 11:
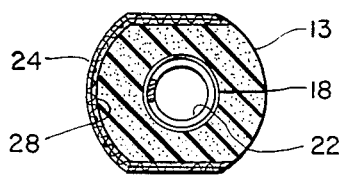

FIG. 11 is an enlarged cross sectional view of a seal with a differently shaped cross section formed by this method.

Figure 12:
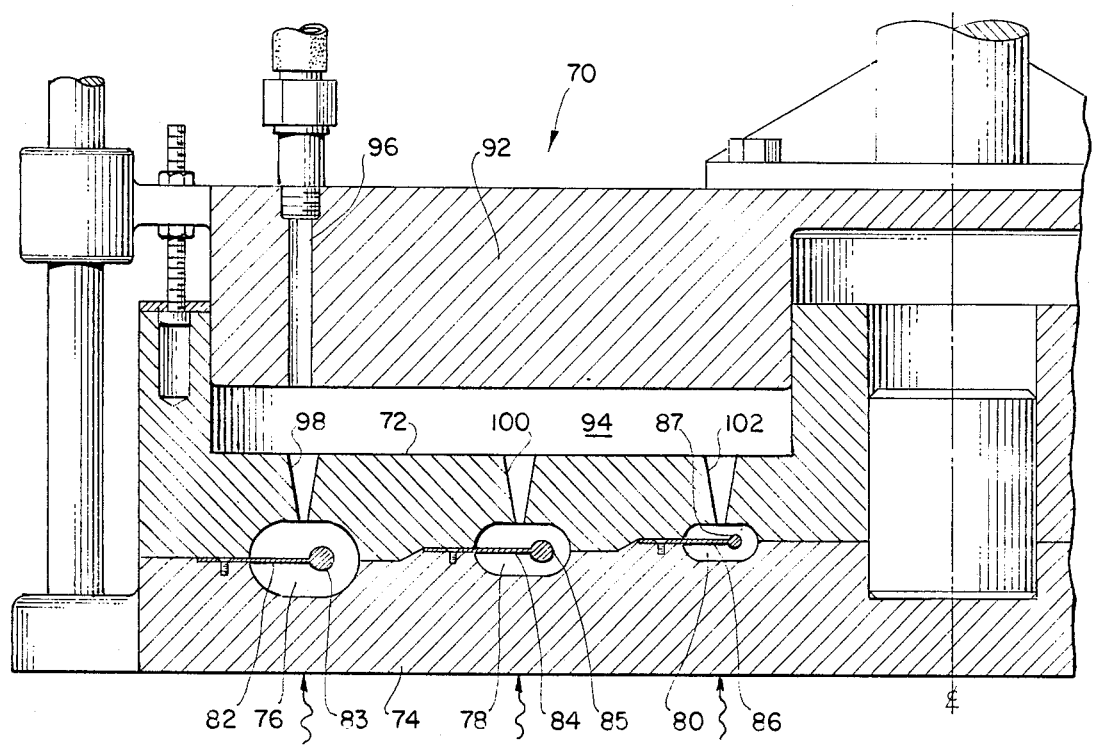

FIG. 12 is a cross sectional view of a mold designed to form a tubular ring of elastomeric material with an integral slit formed by the mold, extending from the outer periphery of the ring to the bore in the ring.

Figure 13:
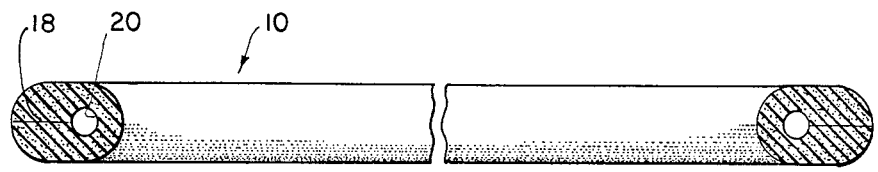

FIG. 13 is a cross sectional view of a ring formed from the mold shown in FIG. 11 and showing the slit formed by the mold communicating with the bore in the ring.

Figure 1:
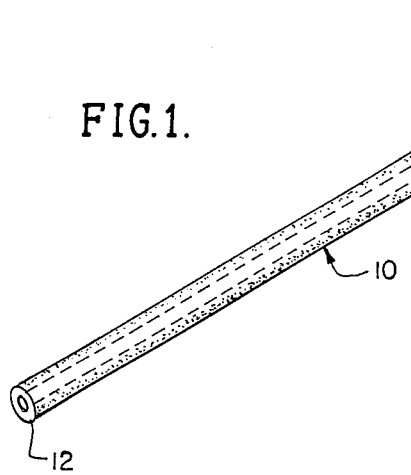
Figure 2:
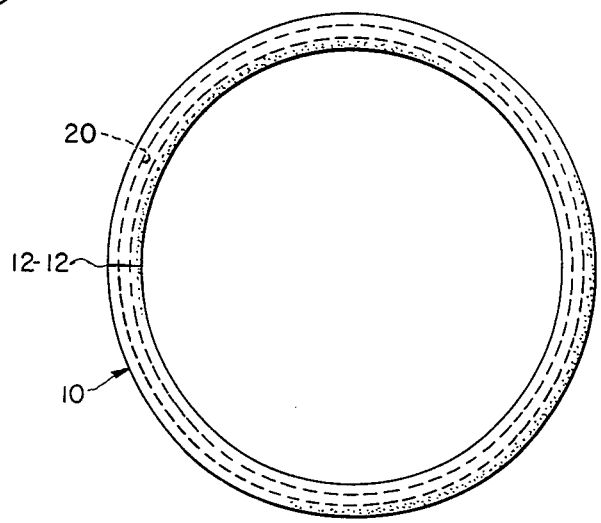

Referring to FIG. 1 of the drawing, a tube formed from an elastomeric material suitable for a seal used in aircraft is extruded by any conventional mechanism in a "set cured" condition. Then the tube is cut to the proper length. Next the opposed ends 12 of each length of material 10 are coated with an adhesive and are joined together to form a tubular ring 10 with a concentric bore 20 formed therein, see FIG. 2.

Figure 3:
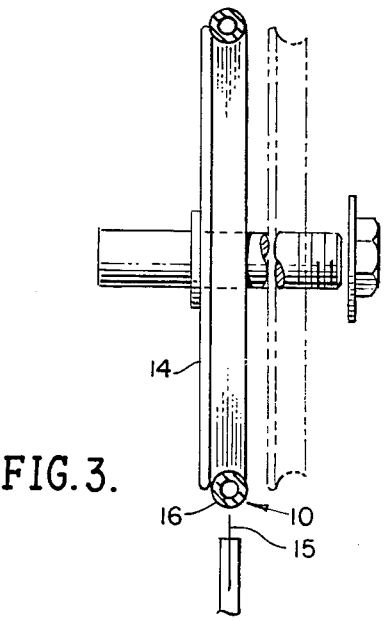
Figures 4, 6:
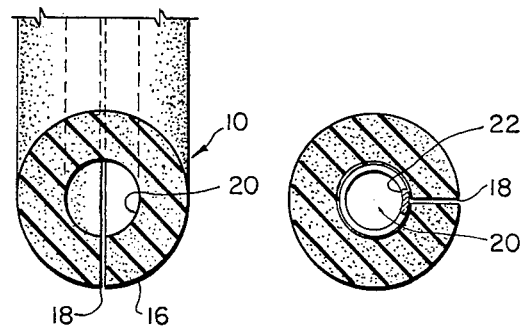
FIG. 6 is a cross sectional view of the seal shown in FIG. 5 taken on the line 6—6 of FIG. 5 and showing the garter spring mounted in the bore of the seal.

Next the ring 10 is mounted on a power driven rotary spindle, or some other suitable device, and a sharp knife 15 is forced against the periphery 16 of the ring 10 until it forms a circumferential slit 18 which communicates with the bore 20, see FIGS. 3 and 4. The use of the sharp knife blade to cut the slit in the periphery of the seal yields an unexpected result in that irregularities in the shape of the blade, such as a curve in the plane of the blade, would not affect the seal because the facing surfaces of the slit cut by such a knife would complement each other. This is important because if the facing surfaces of the slit did not complement each other, distortions in the shape of the seal would occur when the facing surfaces of the slit are cemented together. In contrast to other procedures for forming a slit, the use of a sharp knife blade for cutting the slit eliminates this problem.

Figure 5:
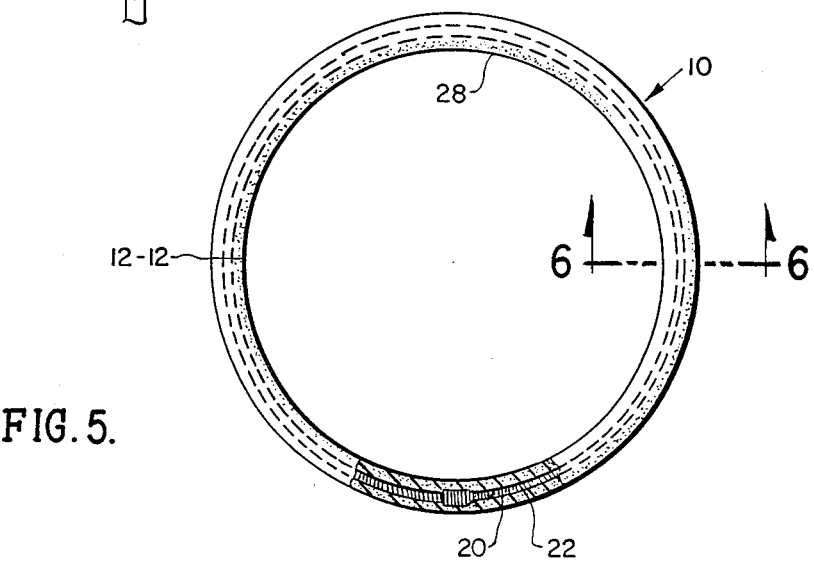

After the slit 18 is formed, the sides are forced apart and a suitable ring shaped garter spring is forced through the seperated sides of the slit 18 into the bore 20 of the ring, see FIGS. 5 and 6. As will be described more fully below, the garter spring 22 is sized so when it is in the bore 20, the turns of the garter spring do not adhere to the walls of the bore. In this way, the garter spring can exert proper compressive force on the ring independent of temperature over a wide temperature range. This compensates the seal for the decreasing resilience of the elastomeric material forming the seal, which occurs over a period of time.

As seen in FIG. 6, the diameter of the turns of the garter spring is slightly less than the diameter of the cross section of the bore of the ring, and the diameter of the garter spring is slightly less than the diameter of the bore. In this way when the garter spring is in the bore 20 the turns of the garter spring do not adhere to the walls of the bore. Another advantage in having the diameter of the turns of the garter spring only slightly less than the diameter of the cross section of the bore is that a larger portion of the work engaging surface of the seal is forced by the garter spring to engage a connector or duct than would be possible if the diameter of the turns of the garter spring were significantly smaller than the diameter of the bore 20. In this way the useful life of the seal is further prolonged.

Next, one or more layers of ring shaped silicon impregnated fiberglass cloth 24 trimmed to the proper size, are placed against the concave surface 35 in mold section 30, see FIG. 7. Next the sides of the slit 18 and the inner surface 28 of the ring 10 are coated with a heat reactive adhesive. Then the ring 10 with the garter spring movably mounted in the bore 20 is placed on the mold section 30 in such a way that the fiberglass cloth 24 faces and abuts the inner surface 28 of ring 10, see FIG. 7.

Then the mold section 30 is covered by mold section 46 forming the mold cavity 61, see FIG. 9. The mold is then inserted in an oven whereby the heat bonds the fiberglass cloth 24 to the inner surface 28 of the ring and bonds the complementary facing surfaces of the slit together. In this way the seal is formed without distortion, with the garter spring fully enclosed in the bore 20 and isolated from high temperatures in case of fire, and with a fiberglass work contacting surface. FIGS. 10 and 11 disclose ring shaped seals with different cross sectional shapes formed by this method.

As seen in FIG. 7, each mold is formed in two mating parts. The first part consists of mold section 30 having a generally cylindrical base portion 31 and a centrally disposed cylindrical portion 33 extending up from the base portion, see FIGS. 7 and 8. The upwardly extending cylindrical portion 33 is smaller in diameter than the base portion 31, in this particular embodiment, although other configurations where the opposite is true are contemplated. The periphery 35 of the upwardly extending cylindrical portion 33 is generally concave, and in this embodiment, serves to completely shape the inner surface of the seal which will ultimately engage a sealing surface on a duct or connector. This arrangement is important because the entire inner work contacting surface of the seal 10 is formed from surface 35 on mold section 30. This prevents the formation of "flash" on the inner work contacting surface of the seal. The elimination of the formation of "flash" reduces the labor required to finish the seal.

The second part of the mold consists of mold section 46. This mold section includes a bore 47 and a counter bore 48, see FIGS. 7 and 9. Sections 30 and 46 in assembled relation form a complete mold for one seal, see FIG. 8.

In order to assemble mold sections 30 and 46 together, mold section 30 is provided with positioning surfaces 54 and 56 which are on the periphery of a circle, see FIG. 7. Surface 54, in addition to functioning as a positioning surface for mold section 46 also serves as the base of the mold cavity, see FIG. 7. Mold section 46 rests on mold section 30 and cooperates with it to form the mold cavity 61, see FIG. 9. The counterbore 48 of mold section 46 has locating surfaces 50 and 52 which are on the diameter of a circle and bear against surfaces 54 and 56 of the mold section 30 and embrace them to hold the sections 30 and 46 together.

In stacked relationship, the lower surface 58 on mold section 30 rests on the upper surface 59 on mold section 46. This closes off the mold cavity 61, permitting the seal to be formed when the molds are inserted in an oven, see FIG. 8. The periphery 49 of the bore 47 in mold section 46, is, in this embodiment, concave, and completely defines the entire outer surface 13 of the seal, see FIGS. 7, 8, and 9. In assembled relation with mold section 46 resting on mold section 30, the concave surfaces 35 and 49 face each other defining the peripheral limits of the mold cavity 61, see FIG. 9.

The method of forming a slit in the periphery of a tubular elastomeric ring by using a sharp razor or knife blade, as shown in FIG. 3 is not practical when the tubular elastomeric rings are tiny. This is because of the cost of the high precision machinery and labor required.

In this situation, another method of forming a slit in a tubular ring where the facing surfaces of the slit complement each other, is required. To accomplish this a special mold is required.

Referring now to FIG. 12, a mold 70 has an upper part 72 and a lower part 74. These parts have complementary cavities facing each other in such a way that when these parts are in abutting relationship, they form circular ring shaped cavities 76, 78, and 80, which in this particular embodiment depict seals having different cross sectional sizes and diameters. The lower mold 72 includes concentric thin blade like portions 82, 84, and 86 which extend from the periphery of the cavities to their interior, see FIG. 12. These blade-like portions terminate in flanges 83, 85, and 87 which are circular in cross section. In this way, when the cavities in the mold are filled with an elastomeric material and the mold is heated, tubular rings of elastomeric material are formed in the mold which have a slit with complementary facing surfaces extending from the periphery of the tubular ring to the bores in the rings.

A press 92 is movably mounted over the circular mold section 72. As shown in FIG. 12, the press 92 is in a raised position defining a chamber 94 for containing an elastomeric fluid or elastomeric material in an uncured condition. If the elastomeric material is in the form of a fluid, it may be introduced into the chamber 94 through a feeder pipe 96. Suitable channels 98, 100, and 102 are formed in the upper mold 72 and connect with the mold cavities 76, 78, and 80.

When the elastomeric material is introduced into the chamber 94, the press 92 is moved downward forcing the elastomeric material into the mold cavities. Heat is applied to the mold to cure the elastomeric material. Then when the press 92 is raised and mold section 72 is lifted off mold section 74, the seal rings are removed from the mold. As shown in FIG. 13, these tubular elastomeric rings will have a slit 18 which extends from the periphery of the ring to the circular bore 20 in the molded ring 10. Moreover distortions or curves in the planes of the thin blade-like portions 82, 84, and 86 do not affect the seal, because, as explained in the above described method, the facing surfaces of the slits formed by these blade-like portions would complement each other. This method also requires the blade-like portions 82, 84, and 86 to be sufficiently thin so that when these facing surfaces are cemented together, the shape of the seal will not be distorted.

Next a garter spring is inserted through the seperated sides of the slit into the bore of the tubular ring 10. As stated in connection with the first described method, the garter spring is sized so when it is in the bore 20 of the seal 10, the turns of the garter spring do not stick to the surface of the bore, whereby the garter spring is movably mounted in the bore of the seal and can exert adequate compressive force on the seal so the seal maintains a sealing engagement with a surface of a connector or aircraft duct, to compensate the seal for the decreasing resilience of the elastomer forming the seal.

Next the tubular ring with a garter spring inserted in its bore is placed in a second mold, like the mold in FIG. 7, and the seal is completed in the same way described above in connection with larger seals.

Having described the invention what I claim as new is:

1. A method of forming a seal for use on aircraft ducts comprising the steps of selecting a tube of "set cured" elastomeric material generally circular in cross section and sized so that the diameter of the tube is large in comparison to the diameter of the bore of the tube, then cutting the tube to a predetermined length, then applying adhesive to the opposed end of this tube of elastomeric material and joining them together to form a tubular ring, next forming a circumferential slit in the outer periphery of the tube which is deep enough so it communicates with the bore in the ring and in such a way that the facing surfaces of the slit complement each other, then spreading the sides of the slit apart and inserting a garter spring into the bore of the ring, the size of the diameter of the turns of the garter spring selected so the turns of the garter spring do not adhere to the walls of the bore so the garter spring in the bore can contract independently of the ring, and the diameter of the garter spring selected so when it is movably mounted in the bore of the ring, the garter spring can exert compressive force on the ring independent of temperature over a wide temperature range for a prolonged period of time, next applying adhesive to the facing complementary surfaces of the slit and to the inner surface of the ring, then selecting a mold which has an inner concave surface shaped to form the work engaging surface of the seal, next applying at least one layer of fiberglass cloth to said inner concave surface of the mold, then inserting the ring in the mold in such a way that its inner surface abuts the surface of said fiberglass cloth and is covered thereby, finally applying heat to the mold to cause the facing complementary surfaces of the slit to bond together without distorting the shape of the seal and to cause the fiberglass cloth to bond to the inner surface of the ring to form the work engaging surface of the seal.

2. The method of forming a seal described in claim 1 wherein the garter spring is selected so it has turns which are slightly less in diameter than the diameter of the cross section of the bore in the ring, and which has a diameter which is less than the diameter of the ring.

3. The method of forming a seal described in claim 1 including the step of cutting the circumferential slit in the periphery of the ring by forcing a sharp knife against the periphery of the ring.

4. A method of forming a seal for use on aircraft ducts comprising the steps of selecting a tubular ring formed from "set cured" elastomeric material which has a predetermined diameter, then forming a circumferential slit in the outer periphery of the ring which is deep enough so it communicates with the bore in the ring and in such a way that the facing surfaces of the slit have complementary shapes, next selecting a garter spring so its turns have a cross sectional diameter slightly less than the diameter of the cross section of the bore, and so the diameter of the garter spring is less than the diameter of the ring, then spreading the sides of the slit apart and inserting the garter spring into the bore in the ring, next applying adhesive to the facing complementary surfaces of the rings to cause the facing surfaces of the slit to adhere to each other without distorting the shape of the seal, then bonding fiberglass cloth to the inner surface of the ring and shaping the cloth to form the work engaging surface of the seal.

5. The method of forming a seal described in claim 4 including the step of cutting the circumferential slit in the periphery of the ring by forcing a knife against the periphery of the ring.

* * * * *